United States Patent [19]

Jeong

[11] Patent Number: 5,075,926
[45] Date of Patent: Dec. 31, 1991

[54] HANDLE FOR ELECTRONIC EQUIPMENT

[75] Inventor: Hae-Su Jeong, Kyunggi-do, Rep. of Korea

[73] Assignee: Samsung Electronics Co., Ltd., Rep. of Korea

[21] Appl. No.: 621,814

[22] Filed: Dec. 4, 1990

[30] Foreign Application Priority Data

May 21, 1990 [KR] Rep. of Korea .................. 90-6804

[51] Int. Cl.⁵ .................. A45C 13/26; A47B 95/02
[52] U.S. Cl. .................. 16/115; 16/DIG. 41; 190/115; 312/244; 403/61
[58] Field of Search .......... 16/115, 111 R, DIG. 5, 16/DIG. 41, 110 R; 74/543, 548, 544, 546; 312/244; 190/39, 115, 117; 403/53, 54, 61

[56] References Cited

U.S. PATENT DOCUMENTS 3,513,952  5/1970  Warner, Jr. .................. 16/115

Primary Examiner—Lowell A. Larson
Attorney, Agent, or Firm—Cushman, Darby & Cushman

[57] ABSTRACT

A portable electronic equipment, such as a laptop computer, is provided with a handle which is slidably mounted to a body of the equipment. The handle comprises a handle body, a pair of sliding rods, and a pair of guide rails. The body has upper and lower fixing plates integrally formed at right and left ends thereof, with the upper fixing plate being provided with a guide groove and the lower fixing plate being provided with a guide hole. The sliding rods have first pin members which are vertically inserted between the guide grooves in the upper fixing plates and the guide holes in the lower fixing plates and second pin members which are horizontally inserted in guide grooves of the guide rails.

4 Claims, 4 Drawing Sheets

HANDLE FOR ELECTRONIC EQUIPMENT

BACKGROUND OF THE INVENTION

The present invention relates to a portable electronic equipment, and particularly, to an improved handle for portable electronic equipment having two link constructions.

Generally, a portable electronic equipment, such as a personal laptop computer, is provided with a handle 10 which is slidably mounted to a body 20 of the equipment as shown in FIG. 1.

The handle 10 is adapted to be received within the body 20 of the equipment when it is not used.

Such a handle 10 is formed with a shaped member having sliding rods 11, 11 at both ends thereof so that it can be slidably mounted to the body 20 of the equipment and moved by a predetermined distance by means of guide rails, which are not shown.

However, a handle 10 of this type is disadvantageous in that when coupling forces are applied to the body while the sliding rods 11, 11 are drawn from the body 20 or received within the body 20 by sliding on the guide rails, both sliding rods 11, 11 are abnormally angled within the guide rails as shown in FIG. 2. Accordingly, the handle 10 is difficult to draw out or slide into the body 20, thereby causing temporary mechanical locking.

Therefore, to obviate the above problem, users must carefully operate the handle 10 to maintain proper balance when drawing out and putting in the handle.

SUMMARY OF THE INVENTION

Accordingly, the object of the present invention is to provide an improved handle for portable electronic equipment which eliminates the aforementioned defects and may be freely drawn out from, or received within, the equipment regardless of the undesirable coupling of forces.

According to the present invention, there is provided a handle for portable electronic equipment comprising a handle body, a pair of sliding rods and a pair of guide rails. The handle body has upper and lower fixing plates integrally formed at right and left ends, with the upper fixing plate being provided with a guide groove, and the lower fixing plate being provided with a guide slot. Each sliding rod has a first pin member on one end which is inserted vertically between the guiding groove and the guiding slot, and a second pin member on the other end which is inserted slidably within a guiding groove of a guide rail. Each guide rail has a guiding groove provided on the top surface, for guiding the sliding rod, and a stopper portion provided on one end for limiting the sliding of the sliding rods.

Other features of the present invention will become apparent from the following detailed description of the invention when taken in conjunction with the accompanying drawings.

DETAILED DESCRIPTION OF THE EMBODIMENT

Figure 1:
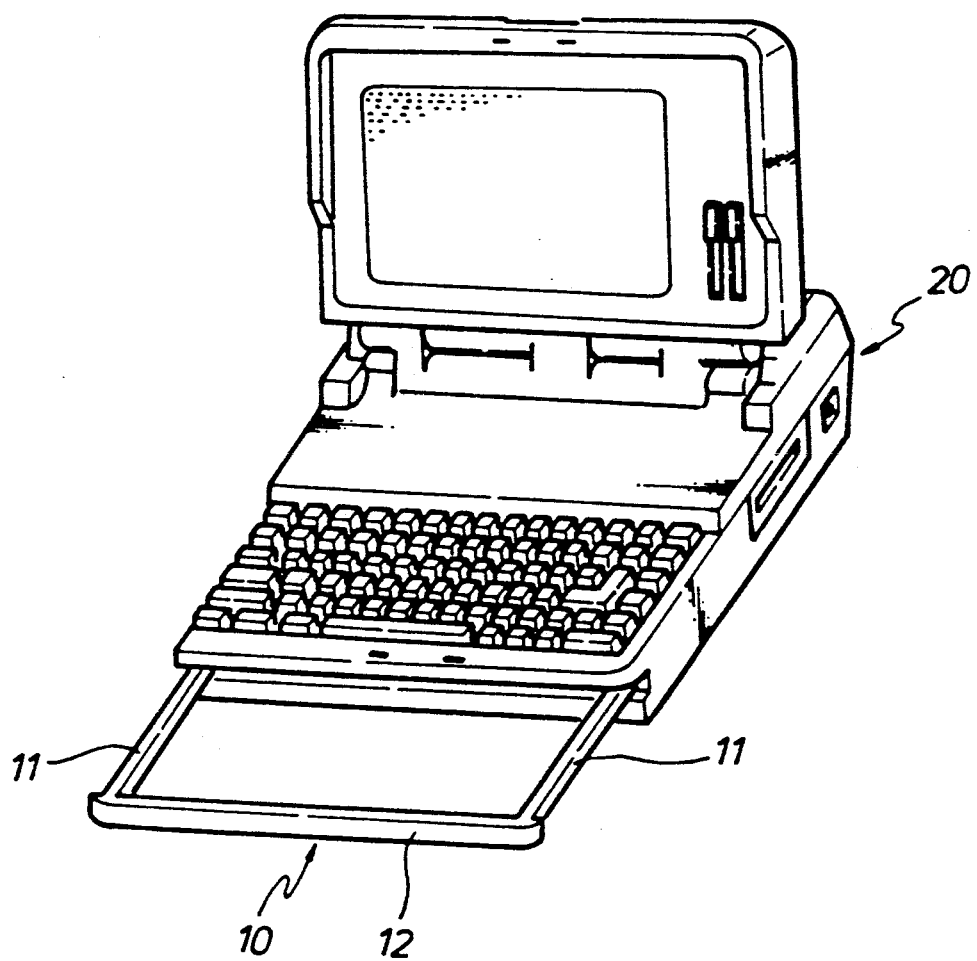
FIG. 1 is a perspective view of an electronic equipment having a conventional handle.
Figure 2:
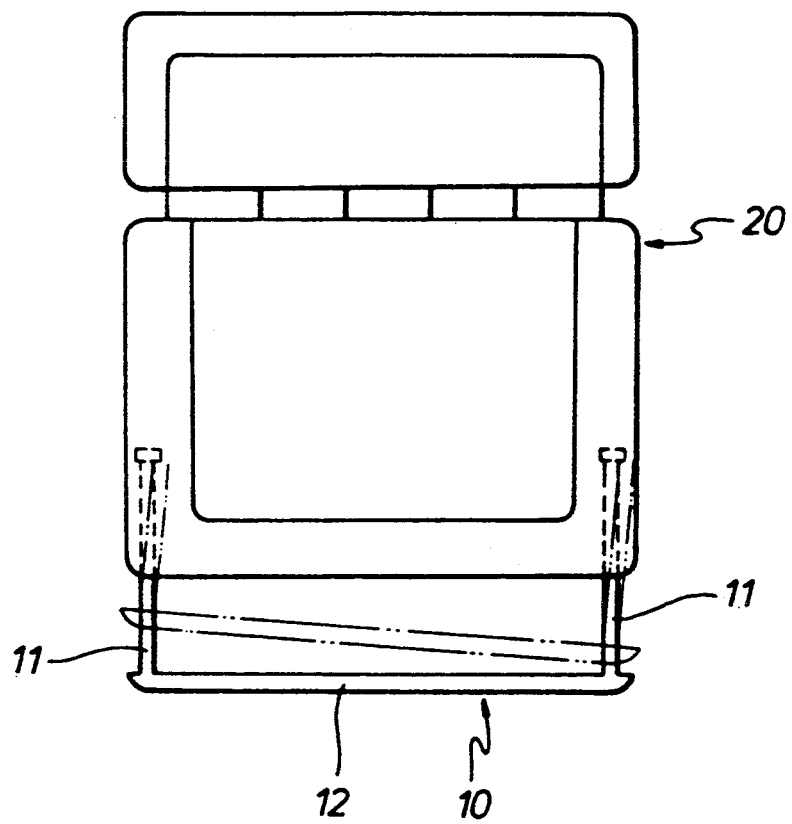
FIG. 2 is a plan view for explaining the operation of the handle shown in FIG. 1.
Figure 3:
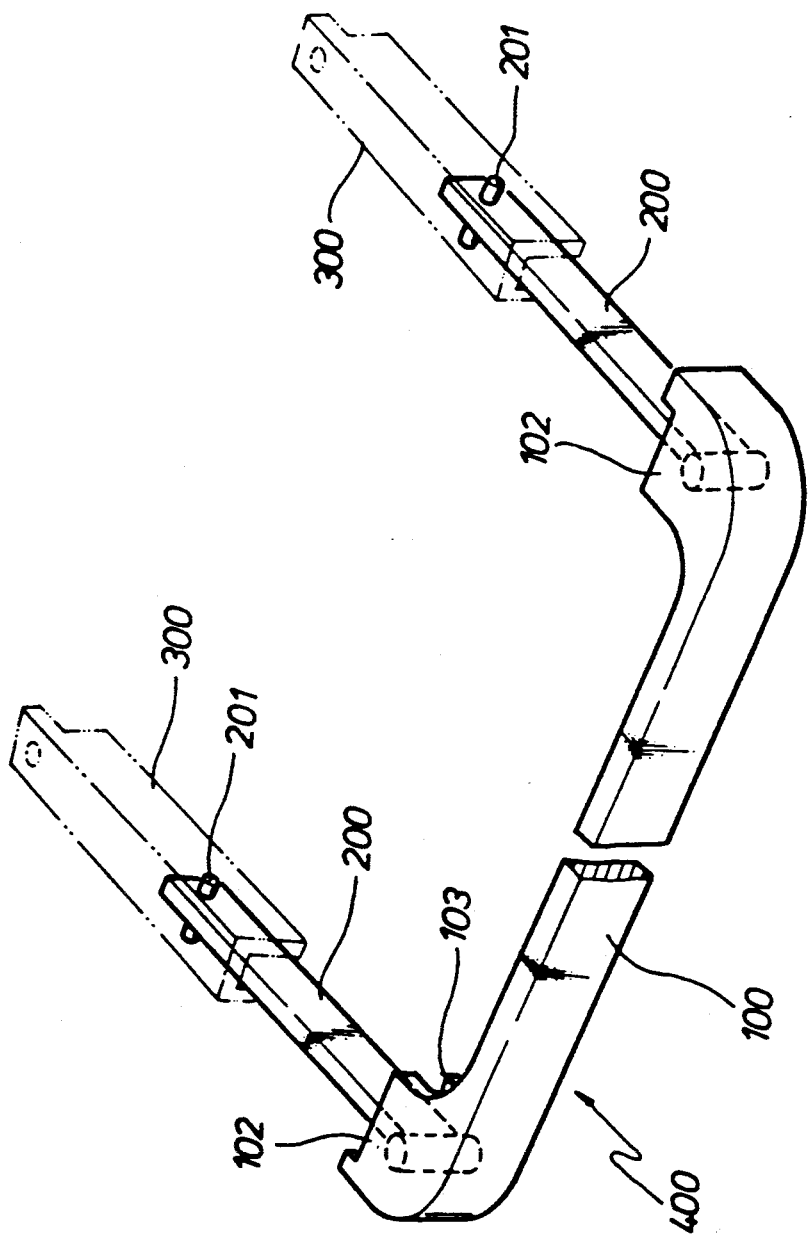
FIG. 3 is a perspective view of a handle according to the present invention.

A handle of a portable electronic equipment according to the present invention is illustrated in FIG. 3. The handle 400 has a body and sliding rods 200, 200 coupled to the body 100 by a link means. Each inner end of the sliding rods 200, 200 are coupled movably to guide rails 300, 300 which are disposed within the equipment.

Figure 4:
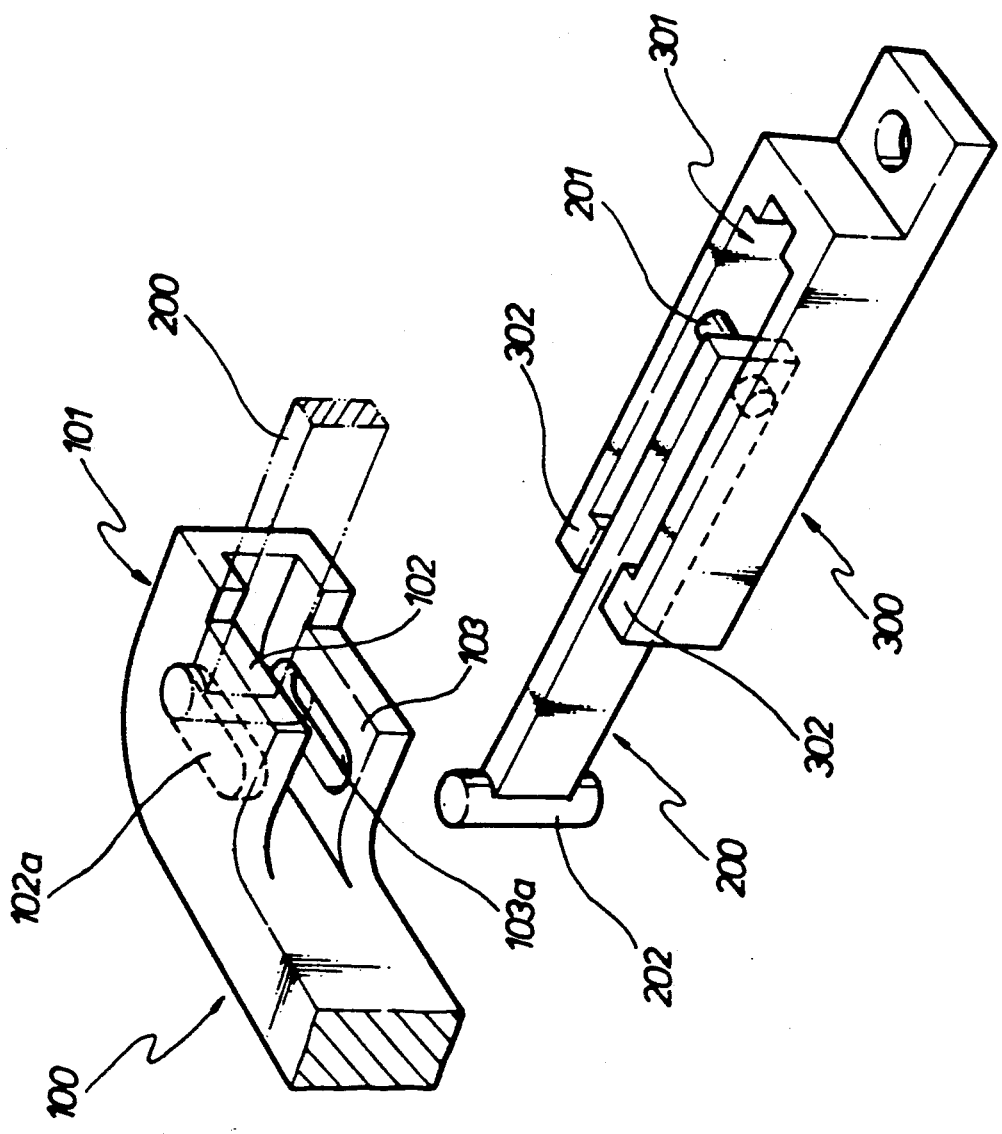
FIG. 4 is an enlarged fragmentary perspective view of the respective elements of he handle shown in FIG. 3.

In more detail, as shown in FIG. 4, at each end 101 of the body 100, an outer pin 202 formed at the outer end of each sliding rod 200 is inserted between a guide groove 102a of the upper fixing plate 102 and a guide slot 103a of the lower fixing plate 103.

In addition, the guide rails 300, 300, for guiding the sliding rods 200, 200, are mounted in parallel within the body of the electronic equipment. Each guide rail 300 is provided with a guide groove 301 which receives an inner pin 201 formed at the inner end of the sliding rod 200. Each guide rail also has a stop portion 302 for limiting the travel of the sliding rod 200 by stopping the pin 201. The guide groove 301 is closed at its opening by a separate component.

The outer pin 202 and the inner pin 201 are formed perpendicularly at opposite ends of the sliding rod 200. The outer pin 202 is inserted vertically between the guide groove 102a and the guide slot 103a, whereas the inner pin 201 is inserted horizontally in the guide groove 301.

In the construction of the handle as mentioned above, appropriate clearance between the guide groove 301 and the inner pin 201 of the sliding rod 200 should be allowed. Particularly, the clearance should allow the sliding rod 200 to rotate sufficiently within the guide rail 300 so that the pin 202 at the outer end of the sliding rod 200 may slide along the longitudinal direction of the body 100 within the guide groove 102a and the guide slot 103a.

Therefore, it is desirable to form the guide groove 102a with U-shaped section and the guide slot 103a as an elongated aperture in the longitudinal direction of the body 100.

As can be readily understood from the above description, the handle 400 according to the present invention is operated very smoothly against an external force exerted in the longitudinal direction of the body 100 by permitting relative movement between the body 100 and the sliding rods 200 and 200 and by the loose engagement of the inner pins 201 of the sliding rods 200, 200 with the guide grooves 301 of the guide rails 300, 300. That is, when coupling forces are applied to the body 100, the angle between the body 100 and the sliding rod 200 may adapt to the forces because the pin 202 at the end of the sliding rod 200 may be rotated and translated sufficiently to prevent the handle from undesirably locking in the guide groove 301.

As a result, of the present invention, it is not cumbersome to operate the handle. In addition, the handle is very simple in the construction and inexpensive to manufacture.

The above example of the present invention is merely illustrative. Accordingly, the present invention is to be considered as including all possible modifications and variations falling within the scope of the invention as defined by the appended claims.

What is claimed is:

1. A handle for portable electronic equipment, comprising:
   a handle having upper and lower fixing plate integrally formed at ends thereof, said upper fixing plate being provided with a guided groove, and said lower fixing plate being provided with a guide slot;
   a pair of sliding rods operatively coupled to corresponding ends of said handle, each of said sliding rods having a first pin member provided on one end thereof inserted between said guide groove and said guide slot of said corresponding end, and a second pin member provided on the other end, said guide grooves and slots extending in a direction longitudinally with said handle and perpendicular to the extent of said sliding rods; and
   a pair of guiding rails for guiding corresponding ones of said sliding rods, each of said guiding rails having a guiding groove provided on a top surface for receiving said second pin member of said corresponding sliding rod, and a stop portion provided on one end for limiting the sliding of said corresponding sliding rod.

2. A handle as claimed in claim 1, wherein said guide groove in the upper fixing plate has a U-shaped section.

3. A handle as claimed in claim 1, wherein said first pin member is substantially cylindrical with an axis formed in a first direction and said second pin member is substantially cylindrical with an axis formed in a second direction different from said first direction.

4. A handle as claimed in claim 3, wherein said first and second directions are perpendicular.

* * * * *